United States Patent [19]

Hsieh et al.

[11] Patent Number: 5,302,405
[45] Date of Patent: Apr. 12, 1994

[54] METHOD FOR REMOVING CHOLESTEROL AND FAT FROM EGG YOLK BY CHELATION AND REDUCED-CHOLESTEROL EGG PRODUCT

[75] Inventors: Rudolf J. Hsieh, Mt. Laurel; Donald P. Snyder, Turnersville; Eugene W. Ford, Woodbury, all of N.J.

[73] Assignee: Campbell Soup Company, Camden, N.J.

[21] Appl. No.: 937,404

[22] Filed: Aug. 31, 1992

[51] Int. Cl.⁵ .......................... A23L 1/29; A23L 1/32
[52] U.S. Cl. ................................. 426/271; 426/425; 426/429; 426/478; 426/573; 426/575; 426/614
[58] Field of Search ............... 426/271, 614, 573, 575, 426/425, 429, 478

[56] References Cited

U.S. PATENT DOCUMENTS

| | | |
|---|---|---|
| 3,563,765 | 2/1971 | Melnick . |
| 3,594,183 | 7/1971 | Melnick et al. . |
| 3,717,474 | 2/1973 | Fioriti et al. . |
| 3,881,034 | 4/1975 | Levin . |
| 4,103,040 | 7/1978 | Fioriti et al. . |
| 4,104,286 | 8/1978 | Fallis et al. . |
| 4,234,619 | 11/1980 | Yano et al. . |
| 4,333,959 | 6/1982 | Bracco et al. . |
| 4,714,571 | 12/1987 | Tremblay et al. . |
| 4,824,672 | 4/1989 | Day et al. ........................ 424/195.1 |
| 5,037,661 | 8/1991 | Merchant et al. .................... 426/47 |
| 5,091,203 | 2/1992 | Conte, Jr. et al. . |

OTHER PUBLICATIONS

Hatta et al., 1988, *J. of Food Sci.*, 53(2):425–428.
Ramesch et al., 1979, *J. of Am. Oil Chem. Soc.*, 56:585-587.
Chem. Abstr., 1974, 81:118609f.
Chem. Abstr., 1978, 89:72721w.
Chem. Abstr., 1979, 91:89902v.
Chem. Abstr., 1985, 103:103734s.

*Primary Examiner*—Helen F. Pratt
*Attorney, Agent, or Firm*—Banner, Birch, McKie and Beckett

[57] ABSTRACT

A method for removing cholesterol and fat from egg and a reduced cholesterol egg product. An anionic chelating agent which forms a complex with the lipoprotein fraction of egg yolk is added to dilute egg yolk to form a precipitate comprising a complex of lipoprotein and the anionic chelating compound. The solid, complex-containing precipitate is separated from the aqueous fraction. Thereafter, lipids and cholesterol are separated from the precipitated lipoprotein-containing complexes to obtain protein-containing complexes. The egg product comprises the protein-containing complex, fat essentially free of cholesterol, and liquid egg white.

9 Claims, No Drawings

METHOD FOR REMOVING CHOLESTEROL AND FAT FROM EGG YOLK BY CHELATION AND REDUCED-CHOLESTEROL EGG PRODUCT

BACKGROUND OF THE INVENTION

1. Field of the Invention

This invention relates to a method for removing cholesterol and fat from egg yolk by chelation and to a reduced-cholesterol egg product. More specifically, this invention relates to a method for removing cholesterol from egg yolk by separating lipoprotein-containing complexes from egg yolk and extracting cholesterol and fats from the complexes to form protein-containing complexes, which are incorporated into a reduced cholesterol liquid egg product.

2. Description of Related Art

Egg, especially chicken egg, is a popular and desirable component of the human diet. In particular, the nutritive quality of the protein content of egg is valued. Egg is organoleptically pleasing and useful in various manners and methods of food preparation.

Liquid whole egg consists, on the average, of about 64 percent white and about 36 percent yolk. The white contains approximately 12 percent solid matter of a primarily proteinaceous nature. The yolk contains about 50 percent solids, of which a major portion is fat and a lesser portion is protein, the fat and protein being present in approximately a 2:1 ratio. A large proportion of the fat appears to be bound to the protein in the form of lipoprotein complexes. Some of this lipid is easily extractable with fat solvents, such as hexane, and this portion of the lipid is conventionally called "free lipid." It is also referred to as "free fat." The remaining lipid typically is referred to as "bound fat." It can be extracted, but only under more rigorous conditions. The term "fat" is used here, in connection with egg yolk, to refer to both kinds of fat, in a generic sense.

Egg white or egg albumen is essentially an aqueous solution of proteins containing small amounts of other materials such as minerals and sugars, and only a trace of fat. The egg yolk, on the other hand, contains virtually all of the fat and cholesterol of whole eggs. These latter components are present in combination with egg yolk proteins as complex lipoprotein compounds. Consequently, many of the functional properties and nutritional aspects of the egg reside specifically in the yolk portion. This is evidenced by the incorporation of yolk alone as an ingredient in many basic food formulations.

Eggs contain a significant quantity of cholesterol and there is evidence that cholesterol from eggs raises human serum cholesterol level. Medical evidence relates high serum cholesterol levels to disease of the vascular system. Thus, despite the organoleptic appeal and nutritive value of eggs, consumers are becoming reluctant to eat eggs in any form.

Various methods have been proposed for removing cholesterol from eggs or egg yolks to produce a low-cholesterol egg product. However, typically these methods significantly alter the functional properties of eggs thus treated, destroying the suitability of the egg for use in traditional cooking processes and making the low-cholesterol product organoleptically unsatisfactory.

Some methods produce a solid product. One such method is disclosed in U.S. Pat. No. 3,563,765, wherein "free fat" is extracted from dry egg yolk solids by mixing the solids with solvent and heating the mixture to a temperature below 160° F., preferably below 120° F., to avoid denaturation of the protein. A non-polar solvent such as hexane extracts non-polar lipids and cholesterol preferentially from yolk lipoproteins. This results in partial removal of yolk fat. The extracted solids must be heated to remove, by distillation, any solvent which remains in the egg solids.

Methods of replacing fat thus extracted typically incorporate addition of unsaturated fats so as to improve the ratio of polyunsaturated fats to saturated fats in egg products produced. For example, U.S. Pat. No. 3,594,183 discloses a method for replacing the fats in a solid, low-cholesterol, egg-containing product by combining low-cholesterol egg yolk with unsaturated oil. The patent also discloses a method for preparing an egg food product comprising the re-fatted yolk solids.

Methods for producing low-cholesterol solids from liquid egg also are known. For example, U.S. Pat. No. 3,881,034 discloses that cholesterol and free fat can be removed from liquid whole egg by mixing egg with water and an organic solvent. The solvent is selected so that, during distillation separation of the solvent and fat dissolved therein form the egg product, the solvent forms an azeotrope with water at a temperature less than about 140° F. Thus, the free fat and cholesterol are extracted from the egg fluid into the solvent, and the solvent and water are distilled off to leave dry egg powder which is free of cholesterol and of free fat.

Many practitioners find such solvent extraction objectionable because the extraction requires use of organic solvents, which must be separated from the egg product at a temperature less than about 140°-160° F. to avoid thermal denaturation of the egg proteins. Many solvents denature egg protein when extracting lipids from lipoprotein complexes. Denaturation of the egg protein degrades the organoleptic properties and qualities of the resultant product. The solvent also must be suitable for contact with food stuffs. Small quantities of solvent may remain in the egg product, even though the most stringent measures have been taken to remove the solvent. Remaining solvent is objectionable to many consumers, not only because of the health risks solvents are perceived to present, but also because solvents degrade the organoleptic properties of the product.

A method said to remove cholesterol from dried egg powder (whole egg or yolk) without leaving solvent residue in the egg product is disclosed in U.S. Pat. No. 4,104,286. Dry egg powder is contacted with an aqueous ethanol solution (typically 95 percent ethanol) which extracts free fats and cholesterol from the egg powder. The low-cholesterol, low-fat powder is separated from the aqueous solution, which now contains fats and cholesterol. The aqueous solution is further treated to saponify fatty acids, and cholesterol and saponified fatty acids are separately recovered.

Vegetable oil has been utilized to extract cholesterol from egg. For example, U.S. Pat. No. 3,717,474 discloses that cholesterol can be extracted from liquid egg yolk simultaneously with addition of unsaturated fats thereto by using high shear agitation to emulsify and ensure contact between the liquid egg yolk and the unsaturated oil. The patent discloses that high energy mixing is required throughout the treatment to disrupt the water barrier surrounding the yolk fat globules which contain the saturated fat and cholesterol to be extracted. Disruption of the barrier affords the opportunity for the yolk fat droplets and the solvent to come into intimate contact. The period of high shear agitation, which is necessary to ensure that the barrier is disrupted, must be shorter than the time required for the heat generated by the agitation to raise the temperature of the mixture being agitated to the temperature at which egg protein becomes denatured.

In the method described in U.S. Pat. No. 4,333,959, the pH of liquid egg yolk is reduced to a value not below three, preferably between about four and six, to both destabilize and reduce the viscosity of the yolk. Then, the destabilized emulsion is treated with edible oil to form a fine dispersion and extract fat and cholesterol from the yolk droplets. The dispersion is formed by homogenization in an agitator mill utilizing the microballs, in a high pressure homogenizer, or by intense vibration such as that used in continuous disintegrators. The dispersion then is centrifuged to separate low-cholesterol egg yolk from the oil extractant. The patent further discloses that extraction under the same conditions of shear without reduction of the pH of the yolk produces lower, albeit significant, cholesterol reduction in the yolk.

These methods, although they do not require an organic solvent which is not an edible oil, are not entirely satisfactory, because intense agitation is required to destabilize the yolk and maintain the dispersion of yolk in the oil.

Methods of removing cholesterol together with other egg components, such as phospholipids and lipoprotein complexes (which contain the "bound" fat), often are utilized to perform qualitative and quantitative analysis on individual components or to obtain purified components. For example, the method disclosed in U.S. Pat. No. 4,104,286 and described above further comprises recovery of pure cholesterol from the ethanol extractant.

Because the phospholipid concentration of chicken egg yolks is about 8 times the cholesterol concentration, such yolks often are utilized as a source of phospholipids. Yolk phospholipid can be recovered from egg yolk by zinc chloride precipitation of yolk lipids extracted by ethanol, or by other extraction processes known to skilled practitioners.

Typically, these phospholipid and lipoprotein complex extraction processes involve use of methanol and ethanol, which achieve complete lipid removal by denaturing the lipoprotein complexes. Thus-released lipids then are recovered from the extractant. The remaining egg product is not organoleptically satisfying, however, even when a portion of the lipids is replaced. Thus, such processes are not satisfactory for producing organoleptically pleasing low cholesterol egg products. Not only must an organic solvent which is not an edible oil be utilized, but also the texture of the yolk is unacceptable after denaturation of the lipoproteins.

A method for separating phospholipids from egg yolk so that the proteins are not denatured is described in Hatta, "Separation of Phospholipids from Egg Yolk and Recovery of Water-soluble Proteins," J. Food Sci. 53:425–427 (1988). In Hatta's method, sodium alginate aqueous solution is added to dilute egg yolk, the pH preferably is adjusted to between about 5.8 and 6.4, and the mixture is held at room temperature for about 30 minutes to form a precipitate comprising sodium alginate and lipoprotein. The aqueous fraction containing water-soluble protein is separated from the alginate/lipoprotein precipitate by centrifugation at 10,000 G for about 15 minutes. Thus, sodium alginate solution was utilized to separate water-soluble proteins from egg yolk, minimizing the lipid content and maximizing the protein content of the supernatant to avoid denaturation of the water-soluble protein.

The alginate/lipoprotein precipitate is extracted with ethanol to prepare a crude phospholipid extract. Crude extract is further separated, sometimes by centrifugation, into various fractions which are purified. For example, the crude phospholipid extract is treated with zinc chloride in ethanol to form purified phospholipid extract, which then is washed with acetone.

SUMMARY OF THE INVENTION

The invention relates to a method for removing cholesterol and fat from egg and to a reduced cholesterol egg product. In accordance with the method, an anionic chelating agent which forms a complex with the lipoprotein fraction of egg yolk is added to dilute egg yolk to form precipitate comprising a complex of lipoprotein and the anionic chelating compound. The solid, complex-containing precipitate is separated from the aqueous fraction. Thereafter, lipids and cholesterol are separated from the precipitated lipoprotein-containing complexes to produce protein-containing complexes. The egg product comprises the protein-containing complex, fat essentially free of cholesterol, and liquid egg white.

DETAILED DESCRIPTION OF THE INVENTION

The invention is based on the discovery that cholesterol and fat can be removed from egg yolk by chelation with selected anionic compounds. It has been discovered that a complex molecule which comprises the chelating agent and the lipoprotein fraction of the egg yolk is formed by addition of an anionic chelating agent to dilute egg yolk. This lipoprotein/chelating agent complex forms a solid precipitate product which is separated from the remaining aqueous egg fraction. Cholesterol and fat are extracted from the lipoprotein-containing complex to produce a protein/chelating agent complex.

It has further been discovered that a reduced-cholesterol egg product comprising the protein/chelating agent complex, fat essentially free of cholesterol, and liquid egg white is organoleptically acceptable and closely resembles scrambled natural egg. The organoleptic properties of known products are degraded (poor texture and inability to re-establish an emulsion) as a result of the denaturation of the proteins which occurs during the cholesterol removal. In contrast, the organoleptic properties of the reduced-cholesterol egg product of the invention closely resemble those of natural egg.

As used throughout the specification and claims, the phrase "egg yolk" encompasses not only chicken egg yolk, but also any cholesterol-containing reptilian or avian egg yolk having a yolk as described above, wherein cholesterol is associated with lipid-containing molecules. Therefore, although the invention is described generally in relation to chicken egg yolk, the invention also encompasses treatment of any cholesterol-containing egg yolk as described herein.

Skilled practitioners recognize that chelating agents and any other compounds utilized herein, such as water, or solvent for fat and cholesterol, should have purity sufficient to be utilized in contact with food stuffs. Thus, food-grade chelating agents, sufficiently pure water, and the like, should be utilized.

Egg yolk is obtained by any known manner of separating yolk from albumen. Commercial yolk products, such as pasteurized yolks or frozen yolks, also are available. Skilled practitioners recognize that commercial egg yolk products typically contain about 10 to 15 wt. percent egg white. Such products suitably are utilized in the method of the invention; frozen yolk may be used after being thawed.

Yolk is diluted with water. Typically, the temperature of both yolk and water is between about 40° and 140° F., preferably between about 40° and 90° F., and more preferably between 55° and 80° F. The quantity of water is at least about 2 times the weight of the yolk. Preferably, the quantity of water is between about 2.5 and 10 times the weight of the yolk, and more preferably is between about 3 and 6 times the weight of yolk. Dilution with water reduces the viscosity of the reaction system and facilitates subsequent contact and interaction between lipoprotein complex and anionic chelating agent.

Addition of an excess quantity of water, for example, greater than about 10 times the weight of the yolk, is unnecessary to achieve cholesterol removal and is uneconomical. After the lipoprotein-containing precipitate forms, the remaining solution comprises an aqueous solution of soluble proteins. This solution is useful, inter alia, as a source of protein which can be concentrated by known methods, such as reverse osmosis or ultrafiltration. Thus, addition of more than about 10 parts of water per part yolk not only requires that more water be added to dilute the yolk, but also dilutes the protein solution remaining after chelation of the yolk solids. Excessive dilution of this solution merely makes obtaining protein from this source more expensive.

Various anionic chelating agents can be utilized in the method of the invention. Suitable anionic chelating agents are those which form complexes with lipoprotein in the yolk. Preferably, anionic surfactants and anionic polysaccharides are utilized as chelating agents. Anionic polysaccharides are more preferred.

Examples of preferred anionic surfactants include sodium cholate, sodium deoxycholate, and sodium lauryl sulfate. Sodium lauryl sulfates are more preferred. At acidic pH's (less than about 5), lipoprotein molecules typically are positively charged, i.e., are cationic, and are precipitated by sodium lauryl sulfate without the presence of divalent cations. However, when the pH is greater than or equal to about 5, divalent cations such as calcium ions, magnesium ions, and manganese ions function as a bridge to help sodium lauryl sulfate in chelating lipoproteins. In particular, at neutral or slightly acidic conditions, i.e., pH between about 5 and 7, especially between about 6 and 7, divalent cations facilitate interaction between lipoprotein and sodium lauryl sulfate molecules to form precipitate.

The concentration of sodium lauryl sulfate in the final reaction mixture typically is between about 0.6 and 5 wt. percent, preferably is between about 0.8 and 1.5 wt. percent. The concentration of calcium ion typically is between about 0.2 and 3 wt. percent, preferably between about 0.5 and 1.5 wt. percent.

Lipoprotein molecules are precipitated by anionic polysaccharides at slightly acidic conditions, i.e., at a pH between about 5 and 7, preferably between about 6 and 7. Use of divalent cations is not necessary. At these conditions, lipoprotein/polysaccharide complexation is essentially complete. However, at pH below about 5, the anionic moieties of the yolk protein and of the polysaccharide become protonated. It is believed that this protonation affects the ability of the polysaccharide to form a complex with the lipoprotein molecules, because, at acidic pH below about 5, lipoprotein/polysaccharide complexes typically do not form.

Anionic polysaccharides are more preferred chelating agents. Preferred anionic polysaccharides including gum arabic, gum ghatti, gum tragacanth, gum karaya, kappa-, lambda- and iota-carrageenan, carboxymethyl cellulose, xanthan gum, and sodium alginate are utilized. Most preferably, gum arabic is employed.

The concentration of most preferred gum arabic in aqueous solution typically is up to about 15 wt percent, preferably between about 1 and 10 wt percent, more preferably between about 2 and 7 wt percent, and most preferably between about 2.5 and 4 wt percent.

Each of the above-identified anionic chelating agents forms a precipitate comprising complexes of lipoprotein and chelating agent. It has been discovered that, surprisingly, gum arabic forms precipitate more quickly than the other polysaccharides. Also, precipitated lipoprotein/gum arabic complex does not require centrifugation to separate it from the remaining aqueous fraction. Further, lipoprotein/gum arabic precipitate contains less aqueous component than precipitates formed by the other polysaccharides. Although the inventors do not wish to be bound by this theory, it is believed that the highly-branched, compact molecular structure of gum arabic forms a more compact chelate structure than the straight chain, linear saccharides.

Gum arabic also is preferred because aqueous solutions thereof have a low viscosity and do not gel at the gum concentrations utilized in the method of the invention, nor do electrolytes adversely affect the aqueous gel solutions. Skilled practitioners recognize that these characteristics are preferred because, for example, low viscosity liquids are transported and stirred more easily than gels. Further, gelation of an aqueous gum solution not only makes it more difficult to make the aqueous solutions and to mix the solution with the yolk to ensure intimate contact between the lipoprotein complexes and the gum, but also typically adversely affects the texture of the low-cholesterol egg product, making the product soft and gummy.

Preferably, the stoichiometrically required quantity of chelating agent is utilized. However, those skilled in the art recognize that a stoichiometric quantity of chelating agent cannot easily be identified because the cholesterol content varies among eggs. Thus, with the teachings provided herein, a skilled practitioner will be able to determine the strength of the chelating agent solution required to obtain a desired level of cholesterol removal. As described above, the pH during formation of lipoprotein/polysaccharide complexes typically is at least about 5, preferably is between about 5 and 7, and more preferably between about 6 and 7.

Typically, less than about 1.0 weight percent anionic chelating agent, based on the weight of the final yolk-polysaccharide mixture, is required. The maximum quantity of each chelating agent utilized is largely a matter of economic choice, as excess chelating agent merely is wasted. The minimum quantity of chelating agent required depends, inter alia, upon the identity of the chelating agent and the quantity of cholesterol which must be removed. Typically, at least about 90 percent of the cholesterol in yolk is removed at the concentration of chelating agent in aqueous solution listed in Table A:

TABLE A

| Polysaccharide | Polysaccharide, wt % of the Final Yolk/Polysaccharide Mixture Typically Required To Remove About 90% of the Cholesterol from an Egg |
| --- | --- |
| Sodium alginate | 0.04–0.06 |
| Carboxymethyl cellulose | 0.02–0.04 |
| lambda-Carrageenan | 0.08–0.10 |
| Xanthan gum | 0.08–0.10 |
| iota-Carrageenan | 0.1–0.2 |
| kappa-Carrageenan | 0.1–0.2 |
| Gum arabic | 0.2–0.3 |
| Gum ghatti | 0.2–0.33 |
| Gum karaya | 0.2–0.33 |
| Gum tragacanth | 0.5–0.6 |

An aqueous solution of anionic chelating agent is utilized. A typical gum arabic solution has a concentration of between about 1 and 10 wt. percent, preferably between about 2 and 7 wt. percent. Therefore, the quantity of gum solution added in accordance with these guidelines and information provided herein, typically is between about 5 and 50 wt. percent, preferably between about 10 and 30 wt. percent, based on the weight of diluted yolk.

The yolk and water are thoroughly mixed, then blended with the aqueous solution of chelating agent. Typically, both the dilute yolk and the chelating agent are at a temperature between about 40° and 140° F., preferably between about 40° and 90° F., and more preferably between about 55° and 80° F.

The solutions are blended together thoroughly and allowed to react and form lipoprotein/chelating agent complex precipitate. Up to about 1 hour is required for precipitate to form. If gum arabic is the chelating agent, the precipitate will settle out of solution by gravity. However, typically, a separation method such as centrifugation or filtration will be required to separate precipitate from the remaining aqueous solution. Centrifugation at 3,000 G for about 15 minutes typically is required to separate lipoprotein/sodium alginate complex precipitate from the remaining solution.

The precipitate comprises lipoprotein/chelating agent complexes together with some aqueous components. Most of the cholesterol also is in the precipitate. The exact composition of the precipitate depends upon the separation technique utilized. Precipitate with sodium alginate is about 33 percent solids. However, surprisingly, the solids content of lipoprotein/gum arabic complex typically is about 45 percent.

The remaining aqueous fraction comprises water-soluble proteins and other aqueous and water-soluble components. The protein in this aqueous fraction can be concentrated by reverse osmosis or ultrafiltration and subsequently utilized to supplement the low cholesterol egg product or in other products.

Cholesterol and fat are extracted from precipitated lipoprotein/chelating agent complex to produce protein/chelating agent complex having reduced fat and cholesterol concentrations. The reduced cholesterol protein/chelating agent complex then is utilized in the low-cholesterol egg product of the invention.

Any method by which fat and cholesterol are extracted from the lipoprotein/chelating agent complex formed in accordance with the method of the invention to yield protein/chelating agent complexes having reduced fat and cholesterol conveniently is utilized in the invention. Skilled practitioners recognize that establishing the fraction of cholesterol and fat which is extracted not only is a technical consideration, but also often is an economic decision. Therefore, the degree of cholesterol and fat removal may be established by the practitioner in accordance with business requirements.

In accordance with a suitable method for treating the lipoprotein-chelating agent complexes to yield protein/chelating agent complexes having reduced fat and cholesterol, the solid complex material is dissolved in aqueous saline (NaCl) solution to form a mixture. The salt concentration in the solution preferably is between about 0.5 and 2.0 wt. percent, more preferably between about 0.8 and 1.0 wt. percent. The quantity of saline solution added to lipoprotein/chelating agent complex material typically is between about 30 and 100 wt. percent based on the weight of solid complex material, and preferably is between about 40 and 60 wt. percent on the same basis. The temperature of both solid and solution before mixing is between about 40° and 140° F., preferably between about 40° and 90° F., and more preferably between about 55° and 80° F.

To this mixture, a quantity of ethanol approximately equal to the total weight of the mixture is added gradually, and the combined mixture of ethanol, water, salt, and lipoprotein/chelating agent complex material is thoroughly blended. Fat and cholesterol are extracted into the ethanol. Typically, about 10 minutes is sufficient to achieve a reasonable degree of extraction. Then, the solid complex from which fat and cholesterol have been extracted is filtered from the fat- and cholesterol-containing mixture of ethanol and salt in water. Skilled practitioners recognize that the extraction step preferably is carried out in an explosion-proof room. Preferably, the temperature at which the extraction is carried out is between about 40° and 140° F., more preferably between 40° and 90° F., and most preferably between 40° and 60° F.

The solid material can be treated a plurality of times with ethanol to extract additional fat and cholesterol. The quantity of ethanol used to remove yolk fat and cholesterol from lipoprotein/chelating agent complex typically is between about 1 and 10 times the weight of the lipoprotein-chelating agent complex, preferably between about 2 and 5 times. Typically, extraction is repeated between about 1 and 10 times, preferably between 2 and 5 times, for complete removal of fat and cholesterol. The degree of extraction can be estimated by the color of the precipitate, which will be white if essentially all of the cholesterol has been removed. The degree of extraction can be determined more precisely by cholesterol quantitation.

Those skilled in the art recognize that the ethanol utilized in this suitable extraction method need not be anhydrous, although it should be essentially free of contaminants which would make it unsuitable for contact with food products. However, after the first extraction, it is preferred to use ethanol which is essentially anhydrous to minimize the quantity of fat- and cholesterol-containing extractant streams and to maximize the concentrations of fat and cholesterol in these streams. These streams subsequently can be treated to separately recover phospholipids, triglycerides, and cholesterol. Any method of separately recovering these fractions, such as by the addition of 1 percent zinc chloride to the extractant to cause phospholipids to precipitate, and separation of triglycerides and cholesterol from the remaining extractant by molecular distillation, may be utilized.

The reduced fat and cholesterol solid protein/chelating agent complex material is utilized in a reduced-cholesterol liquid egg product. If necessary, solvents and extractants (such as ethanol) are washed from the solid, typically with water. The amount of water used to wash ethanol-treated protein/polysaccharide complex typically is between about 1 and 10 times the weight of the complex, preferably between about 3 and 5 times on the same basis. The water and solid protein/chelating agent complex remain in contact for between about 15 and 20 minutes, after which the water is removed by centrifugation. The washing procedure typically is repeated between about 3 to 10 times, preferably between about 3 to 5 times, until the ethanol concentration in the solid complex-containing material is below about 10 ppm. The temperature at which washing is carried out preferably is between about 40° and 90° F., more preferably between about 40° and 60° F. Much of the color is removed in the first extraction. However, color can be added, such as in the form of beta-carotene, to accommodate the color lost to extraction.

Reduced cholesterol liquid egg product of the invention is prepared by mixing reduced fat and cholesterol protein/chelating agent complex with appropriate quantities of egg white, oil essentially free of cholesterol, and other additives, such as emulsifiers, colors, favors, spices, salts, and the like. For example, the lipoprotein/chelating agent solid complexes typically are yellow, like egg yolk, while essentially fat- and cholesterol-free protein/chelating agent complex material typically is white. Citric acid is added to essentially prevent discoloration during heating. Cooked egg product which does not have a sufficient concentration of citric acid will turn brown upon heating.

It has been discovered that reduced cholesterol liquid egg product prepared in accordance with the method of the invention has better flavor, texture, and stability than product prepared by direct ethanol extraction of cholesterol and fat from yolk. The emulsion stability of liquid egg product of the invention is much greater than that of a directly-extracted product. Reduced cholesterol liquid egg product of this invention comprising reduced fat and cholesterol protein/chelating agent complexes is both more stable than and closer in taste to natural yolk than products containing directly-extracted, denatured yolk protein. The complex material helps retain a soft, airy texture of the product, as compared to directly-extracted product, which typically is rubbery and not organoleptically pleasing.

Reduced cholesterol liquid egg product of the invention also has superior emulsion stability and organoleptic properties after having been frozen. Whereas whole egg becomes rubbery after having been frozen, the reduced cholesterol liquid egg product of this invention maintains the emulsion, and, when cooked, is soft and airy.

The following examples are intended to further illustrate the invention, not to limit it in any way. The invention is limited only by the scope of the appended claims.

EXAMPLE 1

One hundred gram portions of chicken egg yolk at a temperature of about 70° F. were diluted with a quantity of water corresponding to 1, 4, or 9 times the weight of the yolk, as set forth in Table 1 below. One portion was not diluted. The water temperature was about 70° F. The resultant quantity of each dilute yolk portion is set forth in Table 1.

Each portion of dilute yolk was blended with 100 g of a 3 wt percent gum arabic aqueous solution; the temperature of the solution was about 70° F.

The gum arabic solution and the dilute yolk were blended together thoroughly and allowed to react and form lipoprotein/gum arabic complex precipitate. The pH of each mixture was about 6.5. The reaction was carried out at about room temperature, (i.e., about 70° F.). No precipitate formed when yolk was undiluted. In each other case, after complexation, yellow lipoprotein/gum arabic precipitate formed. The quantity of precipitate is set forth in Table 1 below.

Precipitate settled out of solution and was recovered. Recovered precipitate then was dissolved in 0.8 percent aqueous saline solution for chemical analysis. As set forth in Table 1 below, the percentage of the precipitate which total solids and fat were determined for each precipitate. Further, each precipitate was analyzed to determine the fractions of total cholesterol and total protein originally present in the yolk which were recovered from the precipitate.

TABLE 1

|  | Dilution Factor | | | |
|---|---|---|---|---|
|  | Un-diluted | 1X | 4X | 9X |
| Yolk, gm | 100 | 100 | 100 | 100 |
| Water, gm | 0 | 100 | 400 | 900 |
| Dilute Yolk | 100 | 200 | 500 | 1000 |
| Gum Arabic Sol'n at 3%, gm | 100 | 100 | 100 | 100 |
| Yolk/Gum Arabic Sol'n, gm | 200 | 300 | 600 | 1100 |
| Characteristics of Lipoprotein/ Gum Arabic Complex Precipitate | | | | |
| Weight, g | None | 98.6 | 217 | 346 |
| Total Solids, wt % |  | 21.4 | 18.3 | 11.6 |
| Fat, wt % |  | 14.5 | 13.0 | 8.3 |
| Removal, wt % of amount present in yolk | | | | |
| Cholesterol |  | 72 | 94 | 94 |
| Protein |  | 66 | 73 | 75 |

The data summarized in Table 1 illustrate that neither cholesterol nor protein removed in precipitate differed significantly between the 4× and 9× dilution examples.

EXAMPLE 2

One hundred gram portions of chicken egg yolk at a temperature of about 70° F. were diluted with 250 g water at a temperature of about 70° F. to produce 350 g portions of dilute egg yolk having a temperature of about 70° F. Each of the portions of dilute yolk was blended with 100 g of aqueous solution of gum arabic having a concentration of 1, 3, 5, or 10 wt percent. Thus, the total quantity of yolk/gum arabic solution was 450 grams.

The remainder of the precipitate formation, recovery, and analyses were as set forth in Example 1. The result of these analysis is set forth in Table 2.

TABLE 2

|  | Gum Arabic Concentration, wt % | | | |
|---|---|---|---|---|
|  | 1 | 3 | 5 | 10 |
| Characteristics of Lipoprotein/ Gum Arabic Complex Precipitate | | | | |
| Weight, g | 145 | 162 | 165 | 141 |
| Total Solids, wt % | 21.9 | 22.4 | 21.2 | 19.8 |
| Fat, wt % | 14.9 | 15.0 | 14.0 | 12.3 |
| Removal, wt % of amount present in yolk | | | | |
| Cholesterol | 70 | 86 | 79 | 59 |
| Protein | 60 | 69 | 64 | 51 |

The data set forth in Table 2 illustrate that maximum cholesterol removal was achieved with 3 wt percent gum arabic solution, although effective cholesterol removal was achieved at each concentration.

EXAMPLE 3

Precipitate obtained in accordance with Example 2 at 3 wt percent gum arabic solution was solubilized in a 0.8 percent saline solution for ethanol extraction. Then the lipoprotein-gum saline solution was treated with ethanol in accordance with the method described in the specification. The weight ratio of ethanol to precipitate varied between 1:1 and 10:1, as set forth in Table 3 below.

The data set forth in Table 3 summarize the cholesterol distribution between the ethanol extractant and the lipoprotein/gum arabic complex precipitate and the fat concentration in the extractant and precipitate. Each extraction was carried out in a single 10 minute stage at a temperature of about 70° F.

TABLE 3

| Ethanol/Precipitate weight ratio | % Fat | Ethanol Phase % of Total Cholesterol | % Fat | Precipitate Phase % of Total Cholesterol |
|---|---|---|---|---|
| 1:1 | 0.24 | 1.5 | 24.1 | 98.5 |
| 2:1 | 0.75 | 23.1 | 18.9 | 76.9 |
| 4:1 | 1.37 | 59.8 | 14.3 | 40.2 |
| 6:1 | 1.19 | 70.0 | 9.5 | 30.0 |
| 8:1 | 0.86 | 71.0 | 9.0 | 29.0 |
| 10:1 | 0.76 | 77.7 | 5.8 | 22.3 |

The data in Table 3 illustrate the diminishing effect on cholesterol extraction as the ethanol/precipitate weight ratio exceeds about 6:1.

EXAMPLE 4

Precipitate obtained in accordance with Example 2 at 3 wt percent gum arabic solution was treated with ethanol, then washed with water, to extract fat and cholesterol. Ethanol at a temperature of 70° F. was used in three extraction steps at ethanol/precipitate weight ratios of 1:1 and 3:1. Water at a temperature of about 70° F. was used to wash each ethanol-extracted precipitate three times. The weight ratio of wash water to precipitate was either 2:1 or 8:1, as set forth in Table 4 below. Each ethanol extraction lasted 10 minutes; each water wash, 15 minutes.

TABLE 4

| Ethanol/ Precipitate wt ratio | Water/Precipitate wt ratio | Precipitate Characteristics Total Solids wt % | Fat % | Cholesterol mg/100 g |
|---|---|---|---|---|
| 1:1 | 2:1 | 23.6 | 11.3 | 209 |
|  | 8:1 | 12.5 | 5.7 | 111 |
| 3:1 | 2:1 | 18.4 | 1.6 | 17 |
|  | 8:1 | 17.5 | 0.9 | 12 |

The data in Table 4 illustrate the effectiveness of both ethanol extraction and water washing for reducing both fat and cholesterol in precipitate.

EXAMPLE 5

Reduced cholesterol and fat egg yolk products were prepared according to the method of the present invention (Sample A) and according to the "ethanol extraction without gum complexation" method (Sample B). The yolk products were then tested for emulsification, viscosity, texture, color and flavor, and the results are set forth in Table 5 below. The symbols in the table identify the following characteristics:

TABLE 5

| Quality | Sample A | Sample B |
|---|---|---|
| Emulsification | +++ | − |
| Viscosity | ++ | − |
| Texture | +++ | − |
| Color | ++ | + |
| Flavor | ++ | + |
| Symbol | Characteristic of Product | |
| − | poor | |
| + | good | |
| ++ | very good | |
| +++ | excellent | |

As can be seen from Table 5, reduced fat and cholesterol egg yolk products of the present invention provide for an egg yolk superior in all qualities to an egg yolk product produced by ethanol extraction.

Although preferred embodiments of this invention have been discussed herein, those skilled in the art will appreciate that changes and modifications may be made without departing from the spirit of this invention, as defined in and limited only by the scope of the appended claims.

We claim:

1. A method for producing a low cholesterol liquid egg product comprising:
   (a) separating egg yolk into lipoprotein-containing solids and an aqueous fraction by a method comprising:
      (i) blending dilute egg yolk with an aqueous solution of a lipoprotein chelating agent to form an intimate mixture;
      (ii) allowing the intimate mixture to sit undisturbed for time sufficient to form an aqueous fraction and solid lipoprotein-containing complexes with the chelating agent; and
      (iii) separately recovering the lipoprotein-containing solids and the aqueous fraction;
   (b) removing fat and cholesterol from the lipoprotein-containing solids to form protein-containing complexes having reduced fat and cholesterol; and
   (c) blending liquid egg white, the protein-containing complexes of step (b), and fat essentially free of cholesterol to form a low cholesterol egg product.

2. The method according to claim 1 wherein the lipoprotein chelating agent is selected from the group consisting of gum arabic, gum ghatti, gum tragacanth, gum karaya, kappa-, lambda- and iota-carrageenan, carboxymethyl cellulose, xanthan gum, and sodium alginate.

3. The method according to claim 1 wherein the chelating agent is gum arabic.

4. The method according to claim 1 wherein the concentration of chelating agent in aqueous solution is within the range from about 1 to about 10 wt. percent.

5. The method according to claim 1 wherein the concentration of chelating agent in aqueous solution is within the range from about 2 to about 7 wt. percent.

6. The method according to claim 1 wherein the pH of the mixture is within the range from about 5 to about 7.

7. A low cholesterol liquid egg product comprising liquid egg white, a reduced fat- and cholesterol-containing protein/chelating agent complex, and fat essentially free of cholesterol.

8. The low cholesterol liquid egg product of claim 7 wherein the chelating agent is selected from the group consisting of gum arabic, gum ghatti, gum tragacanth, gum karaya, kappa-, lambda- and iota-carrageenan, carboxymethyl cellulose, xanthan gum, and sodium alginate.

9. The low cholesterol liquid egg product of claim 8 wherein the chelating agent is gum arabic.

* * * * *